(12) United States Patent
Li

(10) Patent No.: US 8,620,074 B2
(45) Date of Patent: Dec. 31, 2013

(54) IMAGE SENSOR APPARATUS AND METHOD FOR SCENE ILLUMINANT ESTIMATION

(75) Inventor: Zhaojian Li, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/474,343

(22) Filed: May 17, 2012

(65) Prior Publication Data
US 2012/0224084 A1 Sep. 6, 2012

Related U.S. Application Data

(62) Division of application No. 11/949,631, filed on Dec. 3, 2007, now Pat. No. 8,229,215.

(51) Int. Cl.
*G06K 9/00* (2006.01)

(52) U.S. Cl.
USPC ........... 382/167; 382/162; 382/165; 382/166; 382/274

(58) Field of Classification Search
USPC .......... 382/162, 166, 165, 167, 274; 358/518, 358/519, 520, 521, 522, 523, 516
See application file for complete search history.

(56) References Cited

U.S. PATENT DOCUMENTS

| | | | |
|---|---|---|---|
| 5,959,720 A | 9/1999 | Kwon et al. | |
| 6,038,339 A | 3/2000 | Hubel et al. | |
| 6,304,294 B1 | 10/2001 | Tao et al. | |
| 6,377,702 B1 | 4/2002 | Cooper | |
| 6,459,449 B1 | 10/2002 | Juen | |
| 6,654,055 B1 | 11/2003 | Park et al. | |
| 6,985,622 B2 | 1/2006 | Hubel | |
| 7,180,629 B1 * | 2/2007 | Nishio et al. | ............... 358/1.9 |
| 7,184,080 B2 | 2/2007 | Kehtarnavaz et al. | |
| 7,200,264 B2 | 4/2007 | Hubel et al. | |
| 7,436,997 B2 | 10/2008 | Ishigami et al. | |
| 2003/0052978 A1 | 3/2003 | Kehtarnavaz et al. | |
| 2003/0052980 A1 | 3/2003 | Brown et al. | |
| 2004/0263642 A1 | 12/2004 | Fuyuki | |
| 2007/0285530 A1 * | 12/2007 | Kim et al. | ............... 348/223.1 |
| 2008/0143844 A1 | 6/2008 | Innocent | |
| 2008/0297620 A1 * | 12/2008 | Goel | ............... 348/223.1 |
| 2009/0141975 A1 | 6/2009 | Li | |

FOREIGN PATENT DOCUMENTS

| | | |
|---|---|---|
| EP | 1583371 A1 | 5/2005 |
| EP | 1843603 A1 | 10/2007 |
| JP | 2007306325 | 11/2007 |
| TW | 200420118 | 10/2004 |

OTHER PUBLICATIONS

Select file history of related U.S. Appl. No. 11/949,631, dated May 16, 2011 though Mar. 20, 2012, 57 pages.

* cited by examiner

*Primary Examiner* — Ali Bayat
(74) *Attorney, Agent, or Firm* — Lathrop & Gage LLP

(57) ABSTRACT

An image sensor apparatus is disclosed. The image sensor apparatus includes an image sensor for generating pixel data corresponding to a scene under a scene illuminant and a processor. The processor includes an illuminant estimation module for receiving a subset of the pixel data associated with a subset of a color space and finding a chromaticity trend in the pixel data subset to estimate the scene illuminant. A white balance and color correction module in the processor applies white balance and color correction coefficients to the pixel data according to the estimated scene illuminant.

4 Claims, 6 Drawing Sheets

IMAGE SENSOR APPARATUS AND METHOD FOR SCENE ILLUMINANT ESTIMATION

RELATED APPLICATIONS

This application is a divisional application of U.S. patent application Ser. No. 11/949,631, filed Dec. 3, 2007, now U.S. Pat. No. 8,229,215 the disclosure of which is incorporated herein by reference.

BRIEF DESCRIPTION OF THE INVENTION

This invention relates generally to the estimation of scene illuminants. More particularly, this invention relates to an apparatus and method for estimating scene illuminants for images captured by an image sensor.

BACKGROUND OF THE INVENTION

Image sensors are semiconductor devices that capture and process light into electronic signals for forming still images or video. Their use has become prevalent in a variety of consumer, industrial, and scientific applications, including digital cameras and camcorders, hand-held mobile devices, webcams, medical applications, automotive applications, games and toys, security and surveillance, pattern recognition, and automated inspection, among others. The technology used to manufacture image sensors has continued to advance at a rapid pace.

There are two main types of image sensors available today: Charge-Coupled Device ("CCD") sensors and Complementary Metal Oxide Semiconductor ("CMOS") sensors. In either type of image sensor, a light gathering photosite is formed on a semiconductor substrate and arranged in a two-dimensional array. The photosites, generally referred to as picture elements or "pixels," convert the incoming light into an electrical charge. The number, size, and spacing of the pixels determine the resolution of the images generated by the sensor.

Modern image sensors typically contain millions of pixels in the pixel array to provide high-resolution images. The image information captured in each pixel, e.g., raw pixel data in the Red, Green, and Blue ("RGB") color space, is transmitted to an Image Signal Processor ("ISP") or other Digital Signal Processor ("DSP") where it is processed to generate a digital image.

The quality of the digital images generated by an image sensor depends mostly on its sensitivity and a host of other factors, such as lens-related factors (flare, chromatic aberration), signal processing factors, time and motion factors, semiconductor-related factors (dark currents, blooming, and pixel defects), and system control-related factors (focusing and exposure error, white balance error). White balance error, for example, causes poor color reproduction and can easily deteriorate image quality if not corrected for.

White balance in an image sensor device refers to the adjustment of the primary colors, e.g., Red, Green, and Blue, in images captured by the device so that a captured image that appears white for the device also appears white for the Human Visual System ("HVS"). The discrepancy in colors perceived by an image sensor device and the HVS arises out of the many light sources available and their different color temperatures. While the HVS is proficient in adapting to different light sources illuminating a scene, commonly referred to as the scene illuminants, image sensors are not capable of accurately capturing color in all color temperatures. For example, a white paper may be captured by an image sensor as slightly reddish under a household light bulb or as bluish under daylight. The same white paper is perceived as white by the HVS under different scene illuminants.

To emulate the HVS, white balance must be performed in image sensor devices. In addition, image sensor devices must also perform color correction in order to improve the accuracy of color reproduction. Color correction is required because the spectral sensitivity of image sensors differs from the color matching functions of the HVS. The RGB values generated by image sensor devices are also device-dependent, i.e., different devices produce different RGB responses for the same scene.

In order to preserve color fidelity or teach an image sensor device how to see as the HVS expects colors to look, color correction is performed to establish the relationship between device-dependent RGB values and device-independent values. The device-independent values are calculated on the "CIEXYZ" color space, which is based on the International Commission on Illumination ("CIE") standard observer color-matching functions.

For white balance and color correction to be performed accurately on image sensor devices, the scene illuminant must be known. In general, there are two ways to obtain the scene illuminant information: measuring the color of the scene illuminant, and estimating it from captured images. Most practically, the scene illuminant information is estimated using various approaches.

For example, earlier work for estimating scene illuminants proposed that the white point of an image corresponds to the average image chromaticity. Another earlier proposal was to take the maximum pixel responses in the Red, Green, and Blue color channels individually and use them as the white point estimate. Both proposals suffer from poor estimation performance.

More recent approaches for estimating scene illuminants rely on the assumption that the range of colors measured by an image sensor device (or the eye) depends on the color of the illuminant, e.g., the reddest red color cannot occur under the bluest light. These approaches evaluate the following question: "How likely is it that a given illuminant would have produced the colors of a given image generated by the image sensor device?" In one approach, referred to as "Color in Perspective," this question is answered by developing models of likely surface colors and illuminant colors and solving a constraint satisfaction problem. This approach is computationally intensive, time consuming, and sensitive to color inconsistencies in captured images.

In another approach, referred to as "Color in Correlation" and described in U.S. Pat. No. 6,038,339, the idea is to exploit the correlation that exists between image colors and scene illuminants, e.g., the reddest image sensor device measurements strongly correlate with the reddest light. In this approach, a correlation matrix memory is built to correlate the data from any image, e.g., an RGB image captured by an image sensor device, to the set of possible scene illuminants. This requires a priori sets of training data corresponding to different known illuminants. Each illuminant is associated with a reference gamut generated by RGB values from the image sensor device in training. Data from a given image captured by the image sensor device are then compared to each reference gamut. The chosen (i.e., estimated) scene illuminant is the one that maximizes the correlation between the image data and the training data.

This Color in Correlation approach, however, is also computationally intensive, time consuming, and requires significant storage. The illuminant correlation matrix needs to be stored in memory and multiplied by a chromaticity vector for each captured image. Depending on the number of illuminants that are used to build the correlation matrix, this could add significant storage and computational costs to image sensor devices. With device manufacturers pushing for lower costs and higher quality, there is a need to provide as accurate white balance and color correction as possible without draining the device resources.

Accordingly, it would be desirable to provide an apparatus and method for estimating scene illuminants that are capable of achieving high white balance and color correction performance with low storage and computational requirements.

SUMMARY OF THE INVENTION

The invention includes an image sensor apparatus having an image sensor for generating pixel data corresponding to a scene under a scene illuminant and a processor. The processor has an illuminant estimation module for receiving a subset of the pixel data associated with a color space subset and finding a chromaticity trend in the pixel data subset to determine the scene illuminant. The processor also includes a white balance and color correction module for applying white balance and color correction coefficients to the pixel data according to the estimated scene illuminant.

An embodiment of the invention includes a method for estimating a scene illuminant in an image sensor device. A plurality of illuminant characteristic curves are generated. Pixel data corresponding to a scene under a scene illuminant is captured by the image sensor device. A pixel characteristic curve is generated for a subset of the pixel data in a color space subset. The pixel characteristic curve is compared to the plurality of illuminant characteristic curves to estimate the scene illuminant.

Another embodiment of the invention includes a processor for use in an image sensor device. The processor has a routine for characterizing pixel data captured by the image sensor device under a scene illuminant with a pixel characteristic curve in a color space subset, a routine for estimating the scene illuminant based on the pixel characteristic curve and a plurality of illuminant characteristic curves, and a routine for applying white balance and color correction coefficients to the pixel data according to the estimated scene illuminant.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

Figure 1:
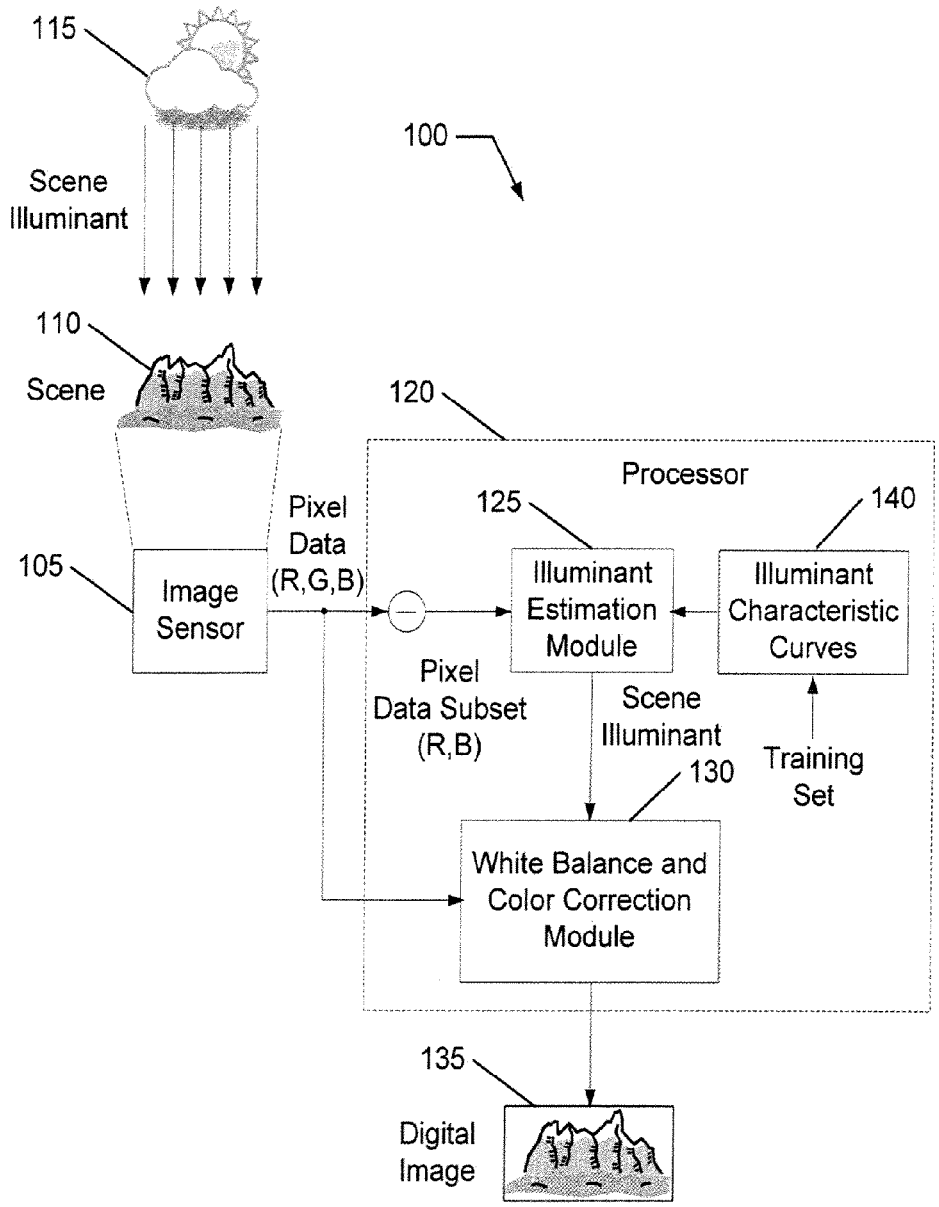
FIG. 1 illustrates an image sensor apparatus constructed according to an embodiment of the invention.

An image sensor apparatus for estimating a scene illuminant is provided. An image sensor, as generally used herein, may be a semiconductor circuit having an array of pixels for capturing and processing an optical image of a scene into electronic signals in the form of pixel data. The apparatus includes an illuminant estimation module for estimating the scene illuminant for the captured image. A scene illuminant, as generally used herein, may be any illuminating source providing light for the scene, for example, natural daylight, ambient office or household light, street light, and so on.

In one embodiment, the scene illuminant is estimated from a set of candidate illuminants, such as the standard illuminants published by the International Commission on Illumination ("CIE"). Common standard illuminants include illuminant A (incandescent lighting), illuminant series C (average or north sky daylight), illuminant series D (various forms of daylight), and illuminant series F (fluorescent lighting). The scene illuminant is estimated as the most likely candidate illuminant given the pixel data for the captured image.

According to an embodiment of the invention, each candidate illuminant is associated with an illuminant characteristic curve representing its chromaticity trend in a two-dimensional color space subset or a two-dimensional chromaticity space, e.g., a Red-Blue, Red-Green, or a Green-Blue subset of an RGB color space. The illuminant characteristic curves for the set of candidate illuminants are generated by acquiring data for a training set under the candidate illuminants. In one embodiment, the training set may be the Munsell color samples, for example, the 1269 Munsell standard color samples.

In one embodiment, each color sample in the training set is illuminated with the candidate illuminants to generate image sensor responses. A statistical trend analysis is applied to the image sensor responses in the color space subset to determine the illuminant characteristic curves representing the chromaticity trend for the candidate illuminants. The statistical trend analysis may be, for example, a regression analysis or any other curve fitting analysis.

The chromaticity trend represents a statistical trend in the data, for example, a linear trend, a quadratic trend, and so on. The chromaticity trend may be expressed as a mathematical curve, e.g., a line, polynomial, etc., with trend coefficients defining the curve. The trend coefficients are used to represent the illuminant characteristic curves, thereby greatly reducing the storage requirements in the image sensor apparatus for storing information associated with the candidate illuminants.

A pixel characteristic curve representing the chromaticity trend of the pixel data acquired by the image sensor apparatus is also generated. The pixel characteristic curve is generated by performing a statistical trend analysis of a subset of the pixel data in the color space subset, for example, the (Red, Blue) pixel data subset in a Red-Blue color space subset. Likelihood values between the pixel characteristic curve and the illuminant characteristic curves are computed, and the maximum likelihood value is determined. The illuminant characteristic curve associated with the maximum likelihood value represents the candidate illuminant that most likely matches the scene illuminant. This candidate illuminant with the highest likelihood value is then selected as the scene illuminant.

An image sensor apparatus constructed according to an embodiment of the invention is illustrated in FIG. 1. Image sensor apparatus 100 includes image sensor 105 for capturing an optical image of a scene, e.g., scene 110, under a scene illuminant, e.g., scene illuminant 115. Image sensor apparatus 100 also includes processor 120 for processing the optical image of scene 110 into electronic signals in the form of pixel data. The pixel data may be, for example, raw RGB pixel data.

According to an embodiment of the invention, processor 120 has an Illuminant Estimation Module 125 for estimating the scene illuminant from various candidate illuminants. The scene illuminant is estimated by finding the most likely candidate illuminant according to a statistical trend analysis of a subset of the pixel data and the candidate illuminants, as described in more detail herein below. The pixel data subset may be a two-dimensional set of the pixel data associated with a two-dimensional color or chromaticity space. For example, the pixel data subset may be the (Red, Blue) pixel data associated with a Red-Blue color space subset.

The estimated scene illuminant is used to perform white balance and color correction on the pixel data in a White Balance and Color Correction Module 130 to generate a digital image 135 corresponding to scene 110. Digital image 135 is a white balanced and color corrected image presenting an accurate color reproduction as a result of the scene illuminant estimation performed in Illuminant Estimation Module 125 and the white balance and color correction performed in White Balance and Color Correction Module 130.

In one embodiment, the candidate illuminants may be, for example, CIE standard illuminants. Each candidate illuminant used in processor 120 to estimate the scene illuminant is represented by and stored as illuminant characteristic curves 140. The illuminant characteristic curves are generated by determining image sensor responses for a training set under the candidate illuminants, as described in more detail herein below. The training set may be, for example, a set of Munsell color samples.

One of ordinary skill in the art appreciates that Illuminant Estimation Module 125 and White Balance and Color Correction Module 130 may be implemented in hardware and/or software. It is also appreciated that illuminant characteristic curves 140 may be stored in processor 120 or in a memory (not shown) coupled to processor 120.

Figure 2:
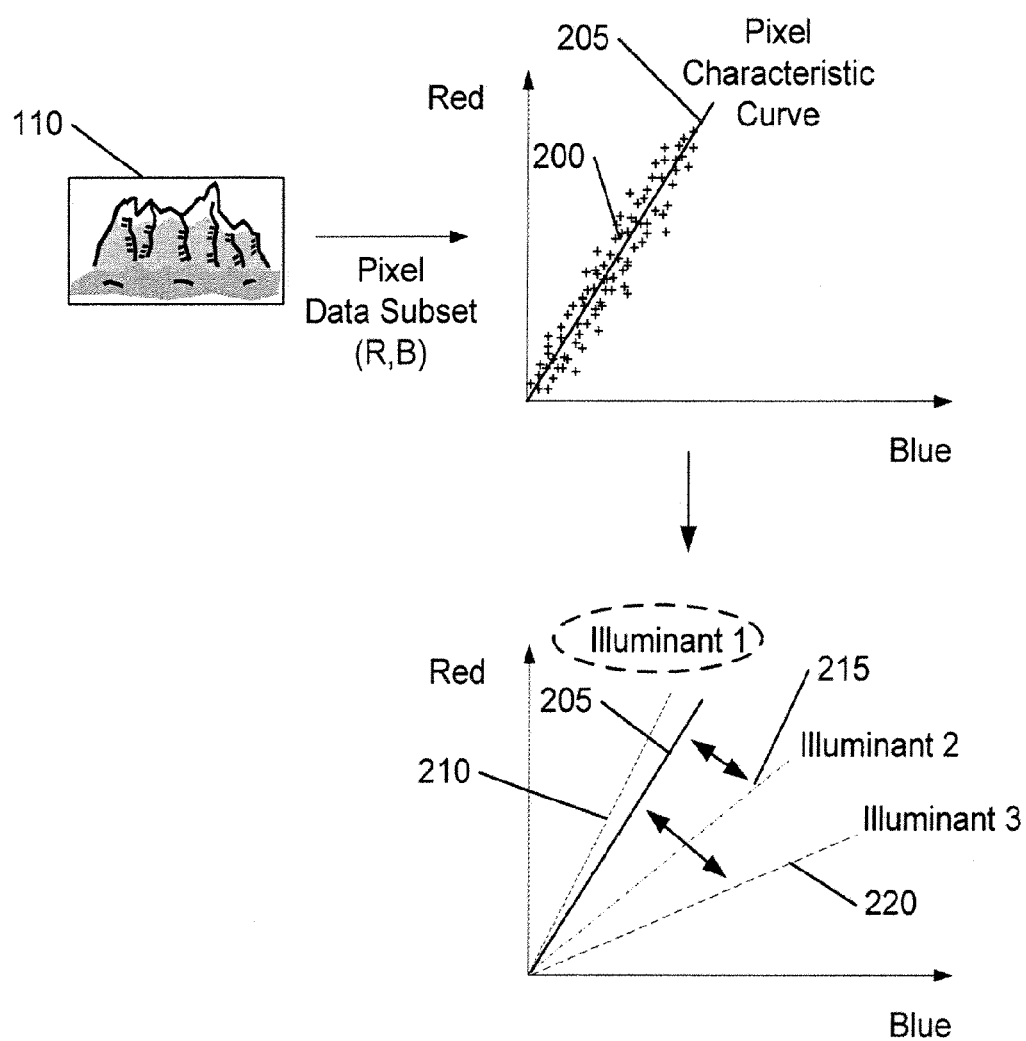
FIG. 2 illustrates a schematic diagram for estimating a scene illuminant with the image sensor apparatus of FIG. 1 according to an embodiment of the invention.

A schematic diagram for estimating a scene illuminant with image sensor apparatus 100, according to an embodiment of the invention, is illustrated in FIG. 2. The scene illuminant is estimated by performing a statistical trend analysis on the pixel data subset associated with the color space subset, e.g., on the (Red, Blue) pixel data subset associated with the Red-Blue color space subset.

Illuminant Estimation Module 125 receives the pixel data subset and finds a chromaticity trend in the pixel data subset to estimate the scene illuminant. This is accomplished by first normalizing the pixel data subset between 0 and 1 and projecting the normalized pixel data subset 200 into its corresponding color space subset. A statistical trend analysis, e.g., a regression or other curve fitting analysis, is then performed to determine a chromaticity trend in the pixel data subset. The chromaticity trend is represented as a curve, e.g., pixel characteristic curve 205. Pixel characteristic curve 205 represents a linear trend in the pixel data subset. As such, pixel characteristic curve 205 may be expressed simply in terms of two trend coefficients, a slope and an intercept.

Similarly, a plurality of illuminant characteristic curves representing a plurality of candidate illuminants may be expressed in terms of two trend coefficients, also a slope and an intercept. The plurality of illuminant characteristic curves represents chromaticity trends, e.g., linear trends, in a plurality of image sensor responses to a training set. For example, illuminant characteristic curve 210 represents the chromaticity trend for image sensor responses acquired for training set under Illuminant 1, illuminant characteristic curve 215 represents the chromaticity trend for image sensor responses acquired for the training set under Illuminant 2, and illuminant characteristic curve 220 represents the chromaticity trend for image sensor responses acquired for the training set under Illuminant 3.

Estimating the scene illuminant then becomes a likelihood estimation problem between the pixel characteristic curve 205 and the illuminant characteristic curves to estimate the candidate illuminant that most closely represents the scene illuminant. In one embodiment, maximum likelihood estimation ("MLE") is performed to determine the candidate illuminant with the maximum likelihood of being the scene illuminant.

For example, Illuminant 1 has the closest illuminant characteristic curve, i.e., curve 210, to the pixel characteristic curve 205. Performing a MLE analysis to determine the maximum likelihood candidate illuminant for the scene represented in pixel data subset 200 results in Illuminant 1 being that maximum likelihood candidate illuminant. Illuminant 1 is then designated as the scene illuminant.

One of ordinary skill in the art appreciates that considerable storage and computational savings are achieved with image sensor apparatus 100. Those savings are mainly achieved by estimating the scene illuminant with only a subset of the pixel data in a color space subset and based on pixel and illuminant characteristic curves that may be represented simply as a set of trend coefficients. Estimating the scene illuminant this way becomes a MLE problem rather than the computational and storage intensive approaches encountered in the prior art.

It is also appreciated that the savings achieved do not degrade image quality. The scene illuminant is estimated with a reliable, robust, and computationally and storage efficient method, without any loss in estimation accuracy.

Figure 3:
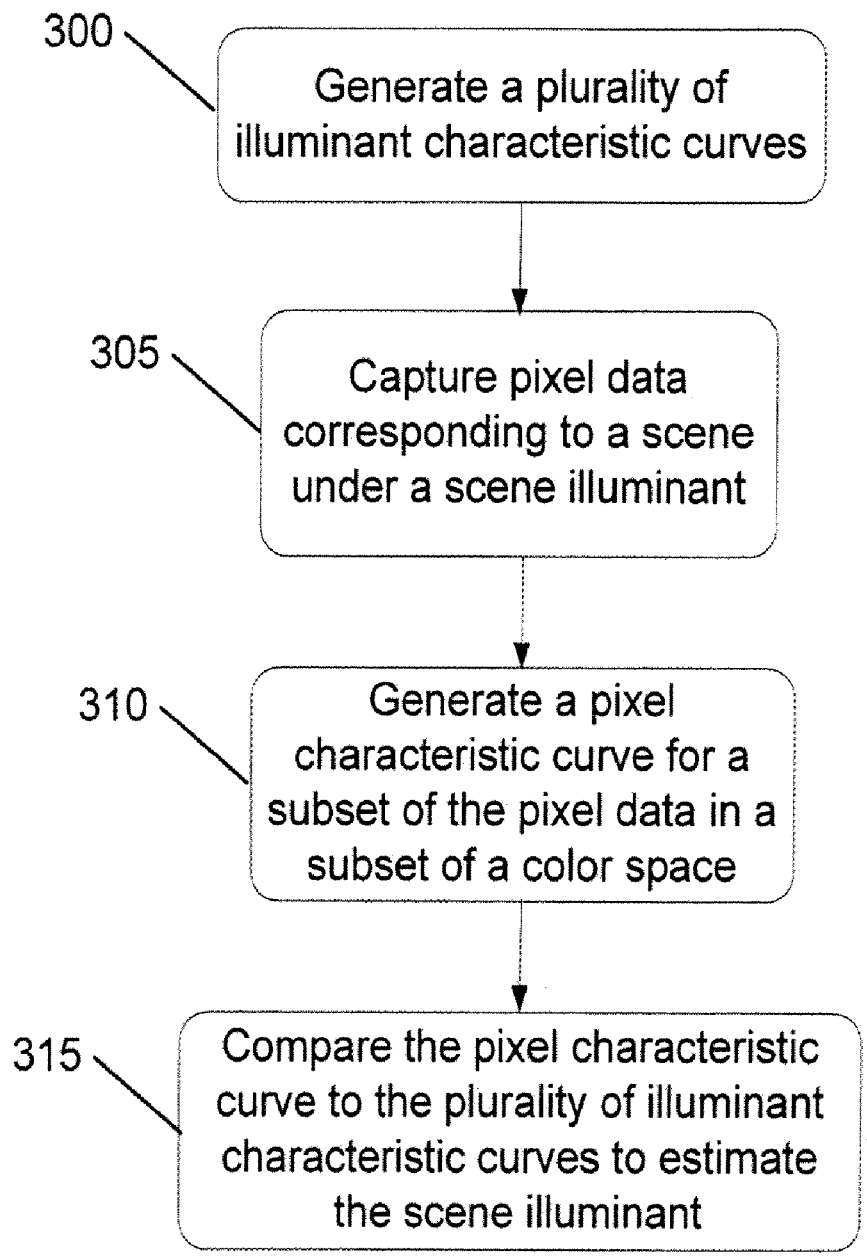
FIG. 3 illustrates a flow chart for estimating a scene illuminant in an image sensor apparatus according to an embodiment of the invention.

Referring now to FIG. 3, a flow chart for estimating a scene illuminant in an image sensor apparatus according to an embodiment of the invention is described. First, a plurality of illuminant characteristic curves are generated in step 300. The illuminant characteristic curves are generated by simulating image sensor responses for a training set, as described herein below with reference to FIG. 4. Next, in step 305, pixel data corresponding to a scene, e.g., scene 110, under a scene illuminant, e.g., scene illuminant 115, is captured by the image sensor 105. A subset of the pixel data associated with a color space subset is then used to generate a pixel characteristic curve in step 310, as described herein below with reference to FIG. 5. The pixel characteristic curve is generated by applying a statistical trend analysis to the pixel data subset. The statistical trend analysis may be, for example, a regression analysis or other curve fitting analysis of the pixel data subset. In one embodiment, linear regression is performed for a normalized pixel data subset, e.g., a (Red, Blue) pixel data subset converted between 0 and 1 in the Red-Blue color space subset.

Lastly, in step 315, the pixel characteristic curve is compared to the plurality of illuminant characteristic curves to estimate the scene illuminant. In one embodiment, likelihood values between the pixel characteristic curve and the illuminant characteristic curves are computed, and the maximum likelihood value is determined. The illuminant characteristic curve associated with the maximum likelihood value represents the candidate illuminant that most likely matches the scene illuminant. This candidate illuminant with the highest likelihood value is then selected as the scene illuminant.

Figure 4:
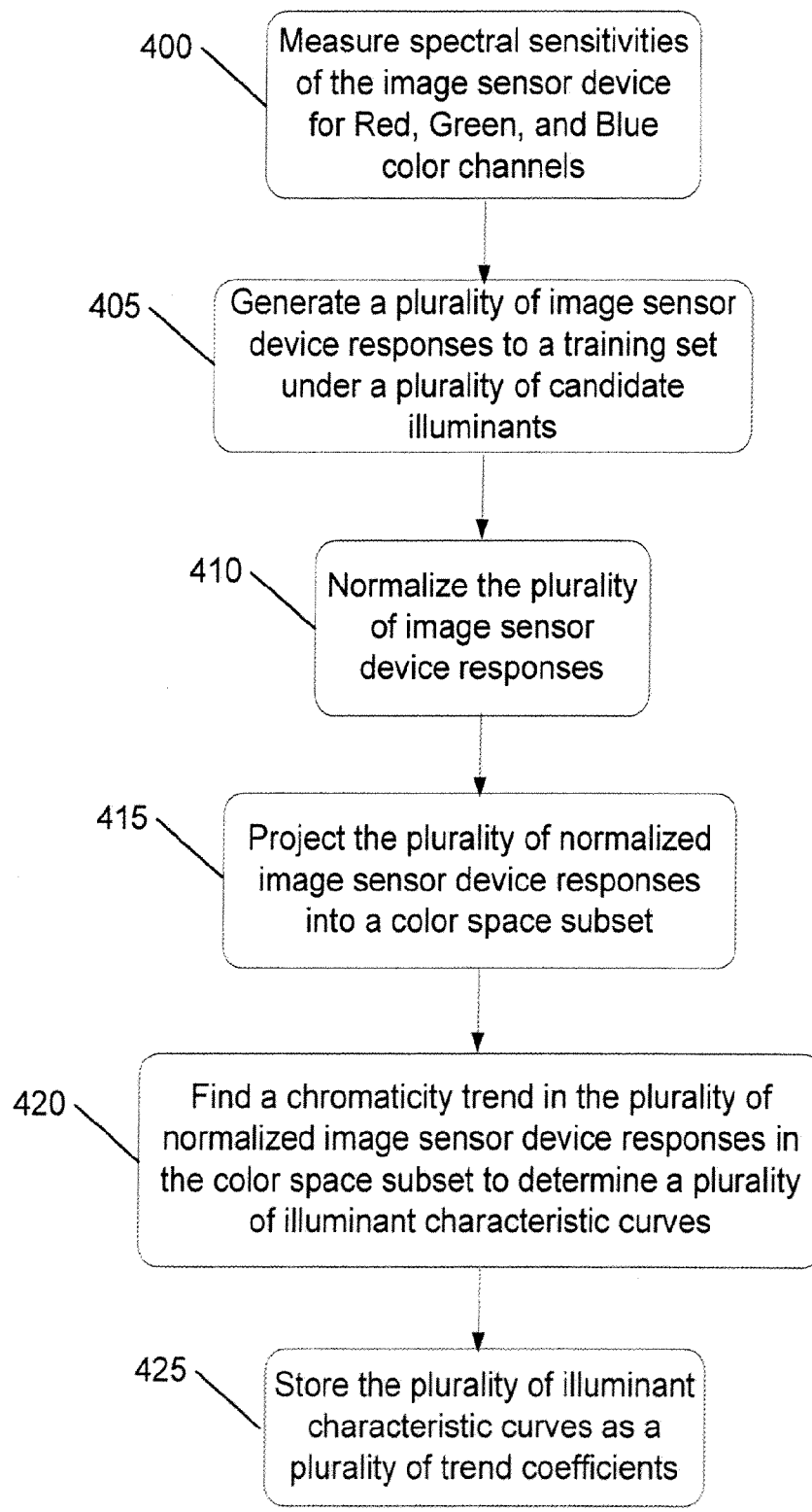
FIG. 4 illustrates a flow chart for generating a plurality of illuminant characteristic curves according to an embodiment of the invention.

A flow chart for generating a plurality of illuminant characteristic curves according to an embodiment of the invention is shown in FIG. 4. First, spectral sensitivities $q_i(\lambda)$ at each wavelength $\lambda$ of image sensor 105 are measured in step 400, where i represents the Red, Green, and Blue color channels. In step 405, a plurality of image sensor responses to a training set under a plurality of candidate illuminants are generated. In one embodiment, the training set may be the Munsell color samples, e.g., the 1269 Munsell standard color samples or chips.

Each image sensor response is generated by capturing an optical image corresponding to a given color sample under a given candidate illuminant. For a given candidate illuminant having a spectral power distribution of $S(\lambda)$, and a given color sample having a surface reflectance of $R(\lambda)$, the image sensor response $D_i$ may be given by:

$$D_i = \int S(\lambda) R(\lambda) q_i(\lambda) d\lambda$$

where i represents the R, G, and B channel, respectively.

The image sensor responses generated for all the candidate illuminants are normalized between 0 and 1 in step 410. For example, for image sensors capturing 8-bit pixel data, the pixel data is converted from values ranging from 0 to 255 into values ranging from 0 to 1. In step 415, the normalized values for each candidate illuminant is projected into a color space subset, e.g., the Red-Blue color space subset. That is, each candidate illuminant is represented with a series of two-dimensional tuples (R,B) having values between 0 and 1, with each two-dimensional tuple corresponding to a Red-Blue value present in the image sensor responses generated for all the color samples in the training set under that candidate illuminant.

Next, in step 420, a statistical trend analysis is performed for the plurality of normalized image sensor device responses in the color space subset to determine a plurality of illuminant characteristic curves corresponding to the plurality of candidate illuminants. The statistical trend analysis determines trend coefficients to represent each candidate illuminant with a chromaticity trend or an illuminant characteristic curve. The trend coefficients may be, for example, a slope and an intercept representing a linear chromaticity trend. The trend coefficients representing the plurality of illuminant characteristic curves for the plurality of candidate illuminants are stored in step 425.

One of ordinary skill in the art appreciates that storing the illuminant characteristic curves, instead of storing the entire illuminant data to represent the candidate illuminants, provides considerable savings in storage and computational requirements. By performing a statistical trend analysis to determine linear trends in the illuminant data, for example, each candidate illuminant may be stored in the image sensor apparatus as simply a slope and an intercept.

It is further appreciated that the spectral sensitivities of the image sensor are not required to be measured, i.e., step 400 may be an optional step. If the spectral sensitivities of the image sensor are unknown, the illuminant characteristic curves may be generated by capturing samples covering large color gamuts under the plurality of candidate illuminants.

Figure 5:
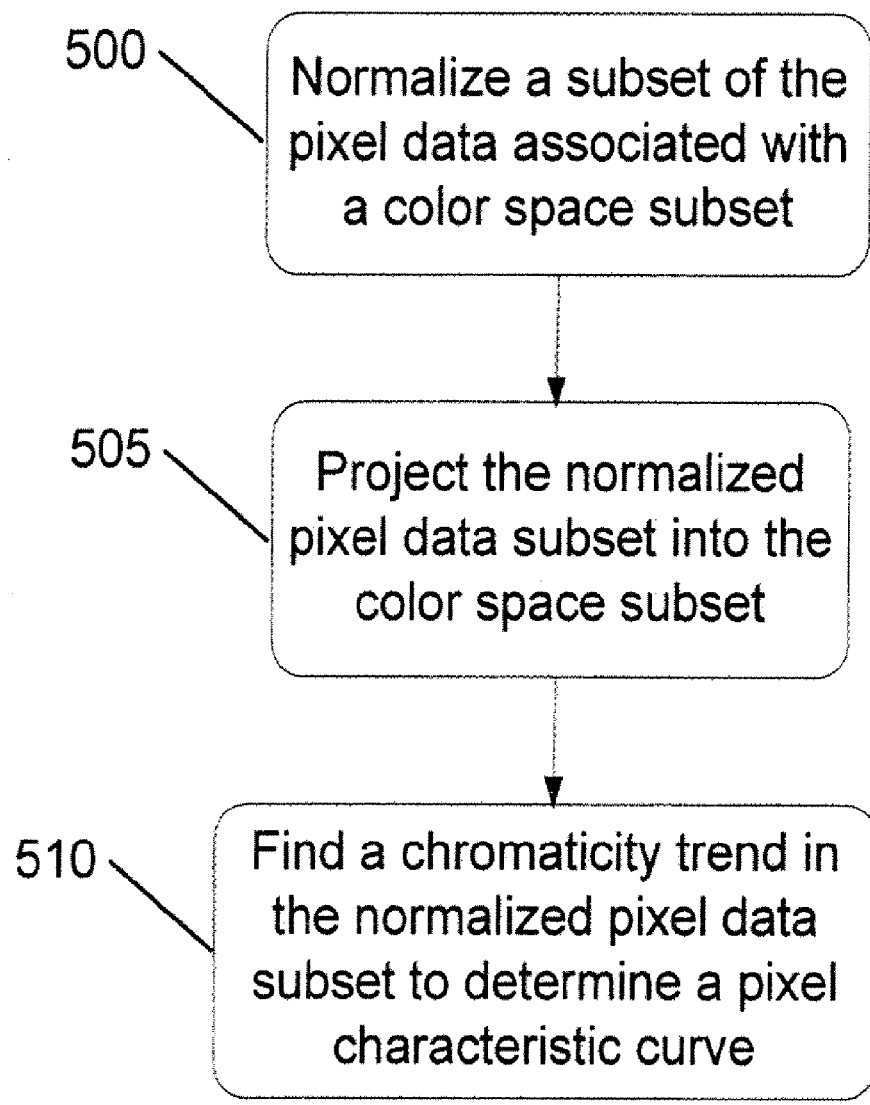
FIG. 5 illustrates a flow chart for generating a pixel characteristic curve according to an embodiment of the invention.

Referring now to FIG. 5, a flow chart for generating a pixel characteristic curve according to an embodiment of the invention is described. The pixel characteristic curve, representing the pixel data acquired by the image sensor for a scene under the scene illuminant to be estimated, is generated in a similar way to the illuminant characteristic curves. First, in step 500, pixel data subset, e.g., (Red, Blue) pixel data, is normalized between 0 and 1.

Next, in step 505, the normalized pixel data subset is projected into the color space subset, e.g., the Red-Blue color space subset. Lastly, statistical trend analysis is performed on the pixel data subset in step 510 to determine trend coefficients corresponding to the chromaticity trend in the pixel data subset. The trend coefficients represent the pixel characteristic curve.

As described above with reference to FIG. 3, the pixel characteristic curve is compared with the plurality of illuminant characteristic curves to estimate the scene illuminant. In one embodiment, the comparison is performed by calculating likelihood values between the pixel characteristic curve and each illuminant characteristic curve. Each likelihood value describes the likelihood that the scene illuminant and the candidate illuminant match. The candidate illuminant with the maximum likelihood value is selected as the scene illuminant.

Figure 6:
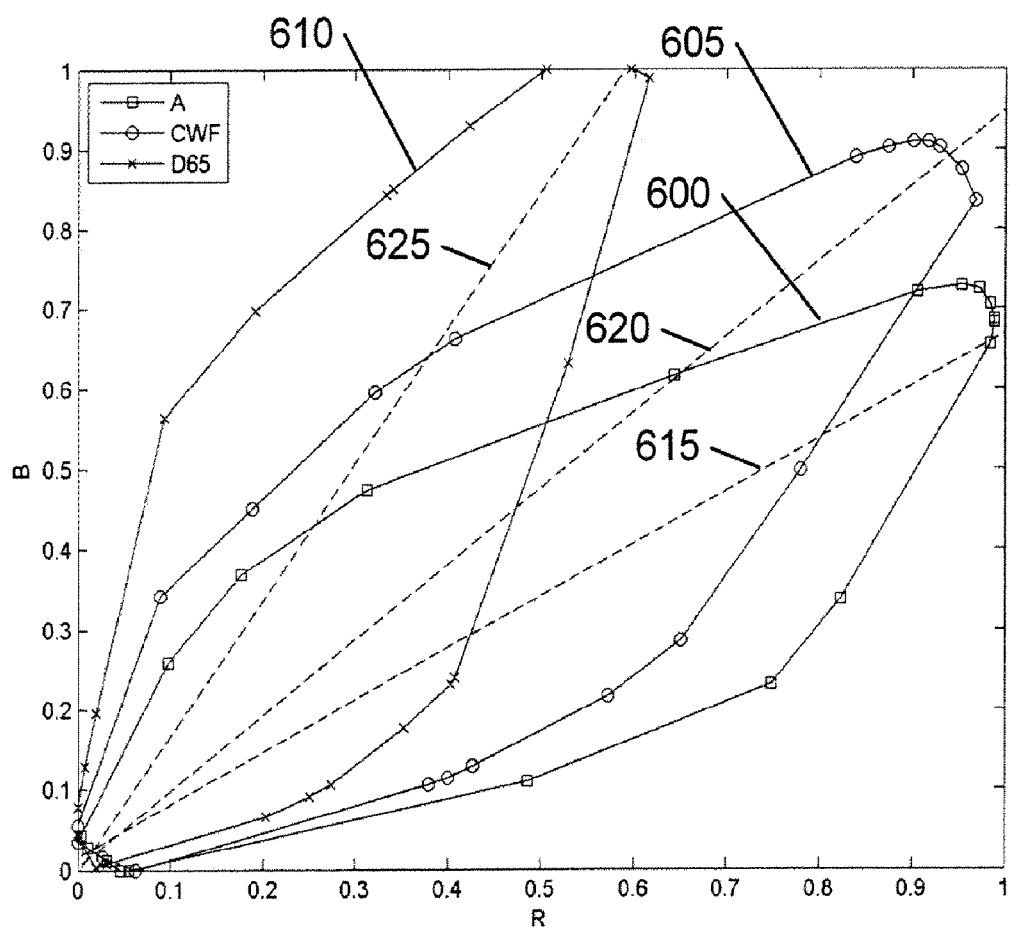
FIG. 6 illustrates exemplary illuminant characteristic curves of three candidate illuminants used in the image sensor apparatus of FIG. 1.

Exemplary illuminant characteristic curves of three candidate illuminants are illustrated in FIG. 6. Graphs 600-610 represent convex hulls of two-dimensional vectors in the Red-Blue color plane for the normalized image sensor responses acquired for three candidate illuminants for the Munsell standard color samples. Graph 600 represents CIE illuminant A (2856 K), graph 605 represents CIE illuminant CWF (4150 K), and graph 610 represents CIE illuminant D65 (6500 K).

As described above with reference to FIG. 4, the normalized image sensor responses are represented with illuminant characteristic curves that are generated by performing a statistical trend analysis in the Red-Blue color space subset. For example, illuminant characteristic curve 615 is the result of linear regression performed on graph 600 for illuminant A, illuminant characteristic curve 620 is the result of linear regression performed on graph 605 for illuminant CWF, and illuminant characteristic curve 625 is the result of linear regression performed on graph 610 for illuminant D65.

As described above, a given pixel characteristic curve is compared with illuminant characteristic curves by computing likelihood values between the pixel characteristic curve and each illuminant characteristic curve. The illuminant with the highest likelihood value is chosen as the scene illuminant for the captured scene. For example, illuminant D65 (daylight) may be chosen as the scene illuminant for an image captured outdoors in natural daylight, illuminant A (tungsten light) may be chosen as the scene illuminant for an image captured indoors under tungsten lighting, and illuminant CWF (fluorescent light) may be chosen as the scene illuminant for an image captured indoors under fluorescent lighting.

Advantageously, the image sensor apparatus of the invention enables scene illuminants to be robustly and reliably estimated with low storage and computational requirements. In contrast to traditional approaches to scene illuminant estimation for image sensor apparatuses, the scene illuminant estimation of the invention is capable of achieving high performance white balance and color correction without major sacrifices in storage and computational resources.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

The invention claimed is:

1. A method for estimating a scene illuminant in an image sensor device, comprising:
   generating a plurality of illuminant characteristic curves;
   capturing pixel data corresponding to a scene under a scene illuminant;
   generating a pixel characteristic curve for a subset of the pixel data in a color space subset;
   comparing the pixel characteristic curve to the plurality of illuminant characteristic curves to estimate the scene illuminant;
   generating a plurality of image sensor device responses to a training set under a plurality of candidate illuminants, the training set comprising a plurality of natural surfaces;
   normalizing the plurality of image sensor device responses and projecting the plurality of normalized image sensor device responses into the color space subset; and
   finding a chromaticity trend in the plurality of normalized image sensor device responses in the color space subset to generate the plurality of illuminant characteristic curves,
   wherein generating the plurality of illuminant characteristic curves comprises measuring spectral sensitivities of the image sensor device for red, blue, and green color channels, and
   wherein finding the chromaticity trend in the plurality of normalized image sensor device responses comprises applying a statistical trend analysis to the plurality of normalized image sensor device responses to determine a plurality of trend coefficients, the plurality of trend coefficients representing the plurality of illuminant characteristic curves.

2. The method of claim 1, wherein generating the pixel characteristic curve in the color space subset comprises:
   normalizing the pixel data subset;
   projecting the normalized pixel data subset into the color space subset; and
   finding a chromaticity trend in the normalized pixel data subset to generate the pixel characteristic curve.

3. The method of claim 2, wherein comparing the pixel characteristic curve to the plurality of illuminant characteristic curves to estimate the scene illuminant comprises determining a maximum likelihood value between the pixel characteristic curve and a illuminant characteristic curve from the plurality of illuminant characteristic curves.

4. The method of claim 3, wherein the illuminant characteristic curve from the plurality of illuminant characteristic curves represents the scene illuminant.

* * * * *